(12) United States Patent
Finefrock

(10) Patent No.: US 6,387,524 B1
(45) Date of Patent: May 14, 2002

(54) TANK LINERS AND METHODS FOR INSTALLING SAME

(75) Inventor: James W. Finefrock, Massillon, OH (US)

(73) Assignee: Blair Rubber Company, Akron, OH (US)

( * ) Notice: Subject to any disclaimer, the term of this patent is extended or adjusted under 35 U.S.C. 154(b) by 0 days.

(21) Appl. No.: 09/487,913

(22) Filed: Jan. 19, 2000

(51) Int. Cl.⁷ .................. B32B 15/06; B65D 81/00
(52) U.S. Cl. .................. 428/461; 428/462; 428/463; 428/465; 428/466; 428/515; 428/517; 428/520; 428/522; 220/62.11; 220/917; 523/404
(58) Field of Search .................. 428/461, 462, 428/463, 465, 466, 515, 517, 520, 521, 522; 220/917, 62.11; 523/404

(56) References Cited

U.S. PATENT DOCUMENTS

| | | | | |
|---|---|---|---|---|
| 3,896,963 A | * | 7/1975 | Schisler | 220/63 |
| 5,073,595 A | * | 12/1991 | Almer et al. | 525/65 |
| 5,395,879 A | | 3/1995 | Murray | 524/571 |
| 5,736,593 A | * | 4/1998 | Sandstrom | 423/437 |
| 6,184,289 B1 | * | 2/2001 | Teranishi et al. | 525/95 |

* cited by examiner

*Primary Examiner*—Paul Thibodeau
*Assistant Examiner*—Monique R Jackson
(74) *Attorney, Agent, or Firm*—Calfee, Halter & Griswold LLP

(57) ABSTRACT

A composite liner for lining substrates, which does not employ volatile organic solvents, is provided. The composite liner comprises a chemical resistant layer, and a tie layer which is tacky prior to cure, disposed on the chemical resistant layer. Once the tie gum layer is disposed on the substrate such as a metal tank liner wall, and cured, the composite liner adheres tightly to the substrate. Also provided is a novel tie gum composition for the tie layer, which comprises a halogenated, sulfonated polyolefin, an epoxidized elastomer, preferably a low viscosity halogenated rubber, a curing agent for the epoxidized rubber, preferably an acid acceptor for the halogenated, sulfonated polyolefin, preferably a tackifier, and preferably an adhesion agent. Also provided is a novel epoxy primer comprised of an epoxy resin system comprising: a liquid bisphenol A epichlorohydrin epoxy resin, having at least two epoxy groups per molecule and an elastomer modified epoxy resin; and primer additives comprising a liquid epoxy functional modifier, and a curing agent for the epoxy resin system. Methods of seaming composite liners and applying composite liners to substrates, are provided. The invention also relates to lined substrates.

21 Claims, 1 Drawing Sheet

TANK LINERS AND METHODS FOR INSTALLING SAME

BACKGROUND OF THE INVENTION

Protecting metal storage tanks from corrosive materials such as acid has historically required the application of rubber sheeting to the tank walls. However, to bond the rubber to the walls, adhesives containing volatile organic solvents are typically employed. Such adhesives typically contain volatile organic solvents, such as, for example toluene, methyl chloride, xylene and the like. Moreover, the application of the adhesive is tedious; multiple coatings are typically required. Typically, both the metal wall and the rubber sheeting are solvent washed and both are coated with adhesive.

Seaming the rubber sheeting while lining a tank also presents problems. The seaming process typically requires the application of volatile organic solvents and cements that contain volatile organic solvents. Moreover, seaming cement are often susceptible to attack by the tank contents.

In addition to environmental concerns, the presence of the organic solvents in the wash and the cement in the enclosed tank necessitate extreme care in handling of equipment to prevent the generation of a spark. Explosion proof lighting must be employed. The enclosed tank also requires that special respiratory protection be employed.

In an attempt to eliminate some of the volatile organic solvents, water based systems have been employed to adhere the rubber sheeting to tank walls. However, such water based systems have proved unsatisfactory; they fail to bond the rubber sheeting to the metal walls particularly when exhaust steam cured. Moreover, the water in the system rusts the metal walls of the tank.

It would be desirable to have a method of protecting metal tank walls from corrosive materials that do not employ volatile organic compounds.

SUMMARY OF THE INVENTION

The invention relates to a novel composite liner which preferably does not employ volatile organic compounds. The composite liner comprises a chemical resistant layer, and a tie layer which is tacky prior to cure, disposed on the chemical resistant layer. Once the tie gum layer is disposed on the substrate such as a tank liner wall, and cured, the composite liner adheres tightly to the substrate. The invention also relates to a novel tie gum composition useful for the tie layer, which comprises a rubber system and an additive system. The rubber system comprises a halogenated, sulfonated polyolefin, and an epoxidized elastomer, and preferably a low viscosity halogenated rubber. The additive system comprises a curing agent for the epoxidized rubber, preferably an acid acceptor for the halogenated, sulfonated polyolefin, preferably a tackifier, and preferably an adhesion agent. Preferably the tie gum does not employ volatile organic compounds.

The invention further relates to a novel method of sealing the seams of composite liner, using a terpene seaming composition or a water based elastomeric seaming composition. The invention also relates to a novel epoxy primer comprised of an epoxy resin system comprising: a liquid bisphenol A epichlorohydrin epoxy resin, having at least two epoxy groups per molecule and an elastomer modified epoxy resin; and primer additives comprising a liquid epoxy functional modifier, and a curing agent in an amount effective to cure the epoxy resin system.

The present invention relates to novel methods of applying composite liners to substrates, particularly metal tanks. The method of applying the composite liner to a substrate preferably does not employ volatile organic compounds. The method comprises the following steps: applying an epoxy primer to the substrate; and then applying the composite liner to the substrate. Preferably the composite liner is seamed by applying a seaming composition to the edges of the composite liner and preferably stitching the composite liner panels together.

The invention also relates to lined substrates that is substrates particularly tanks, which have the composite liner adhered thereto.

DETAILED DESCRIPTION OF THE INVENTION

Figure 1:
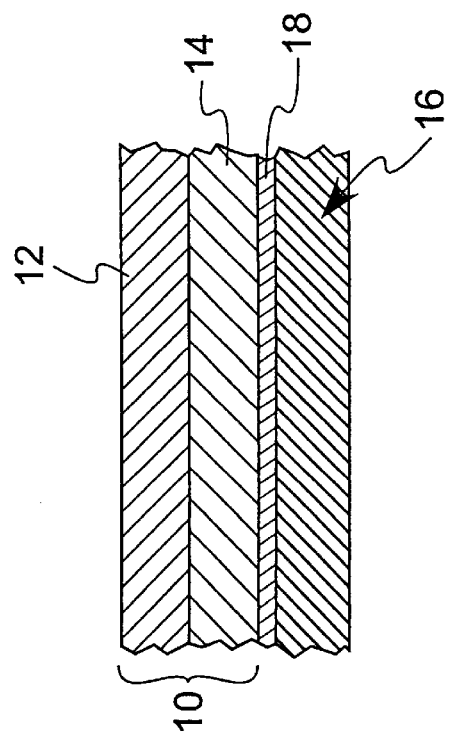
FIG. 1 is a cross sectional view of the composite liner applied to a substrate.

The invention relates to a novel composite liner which comprises a chemical resistant layer and a tie layer, disposed on the chemical resistant layer. Referring to FIG. 1, the composite liner 10 comprises a chemically resistant layer 12, and a tie layer 14 disposed on the resistant layer 12. The tie layer 14 adheres the composite liner 10 to the substrate 16. Preferably, substrate 16 is coated with the epoxy primer layer 18.

Figure 2:
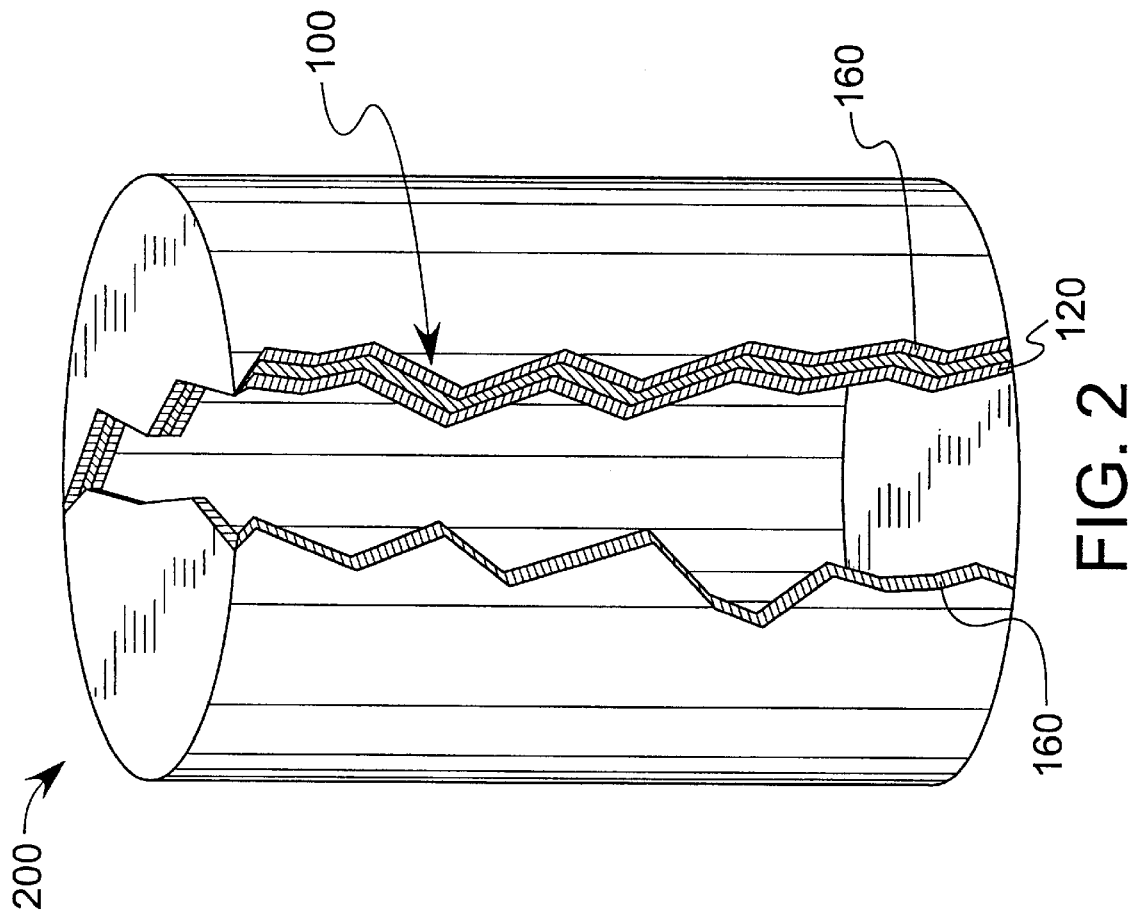
FIG. 2 is a cut away view of the composite liner applied to the interior of a tank.

The chemically resistant layer 12 is comprised of at least one ply and preferably multiple plies. When the chemically resistant layer is comprised of more than one ply, the plies are joined by a conventional lamination techniques. Referring to FIG. 2, when the composite liner 100 is applied to tank wall 160 of tank 200, the chemically resistant layer 120, faces the interior space of the tank 160, and thus will come in contact with the contents of the tank.

Composite Liner

Preferably where the composite liner is used to line storage tanks, the lining is assembled from multiple panels of composite liner panels. Where the composite liner is to be used to line tank walls, the tie layer is preferably from ⅛ to ½ inches thick. The tie gum layer is preferably from 0.020 to 0.050, more preferably from 0.025 to 0.035, most preferably 0.03 inches, and the remainder of the composite liner thickness is supplied by the chemically resistant layer.

The Chemically Resistant Layer

The chemically resistant layer is comprised of an elastomer which is natural or synthetic, which is resistant to corrosive material such as for example acid, alkali, and oxidants. Such elastomers are conventional, and are known in the art. Examples of suitable elastomers are natural rubber, polyisoprene rubber, epoxidized natural rubber, nitrile rubber, polybutadiene, polyisobutylene/butyl rubber, styrene-butadiene rubber styrene-isoprene, polychloroprene, also known as neoprene, bromobutyl rubber, clorobutyl rubber, chlorosulfonated polyethylene rubber, ethylenecopolymer rubbers, olefin based rubbers for example: chlorinated polyethylene elastomer; terpolymer elastomers made from ethylene-proplylene-diene monomer, fluoroelastomers and mixtures thereof.

A suitable elastomer is polychloroprene available under the tradename "Neoprene" from DuPont.

The Tie Layer

The tie layer is comprised of a tie gum. The tie layer holds the composite liner to the substrate. Prior to curing the tie layer, the composite liner is readily removable and repositionable, yet the tie layer provides sufficient tack to hold the composite liner in place on vertical surfaces and preferably to hold the composite liner in place while hanging from horizontal surfaces. Once the tie gum is cured, the tie layer bonds the composite liner to the substrate with significant adhesion force. Once cured, the composite liner preferably bonds to the substrate with an adhesion force of at least 30 lbs/linear inch, more preferably at least 35 lbs/linear inch, most preferably at least 40 lbs/linear inch, as determined by ASTM D-429.

The tie gum comprises a rubber system and an additive system. Preferably there is from 0.1 to 1,000 parts per hundred parts rubber, hereinafter "phr", more preferably from 0.5 phr to 500 phr, most preferably from 5 phr to 300 phr of the additive system. The rubber system comprises an epoxidized elastomer, a halogenated, sulfonated polyolefin and preferably a low viscosity halogenated rubber. The tie gum additive system comprises: a curing agent for the epoxidized rubber, an acid acceptor for the halogenated, sulfonated polyolefin, preferably a tackifier, preferably an adhesion agent and preferably a curing agent for the halogenated, sulfonated polyolefin. Unless stated otherwise, all percents are by weight.

The rubber system contains from 1% to 90%, preferably from 5% to 50%, even more preferably 10% to 20% of the halogenated, sulfonated polyolefin; from 10% to 99%, preferably from 45% to 75%, most preferably from 55% to 65% of the epoxidized rubber; and from 0% to 60%, preferably from 1% to 60%, more preferably from 11% to 41%, most preferably from 21% to 31% of the low viscosity halogenated rubber.

Preferably the tie gum, more specifically the rubber system contains less than 5%, more preferably less than 1% non-epoxidized elastomer. Preferably, the tie gum contains less than 5% more preferably less than 1%, even more preferably less than 0.1%, most preferably less than 1 part per million volatile organic compounds.

The curing agent for the epoxidized rubber is present in an amount effective to cure the epoxidized rubber. Good results have been obtained using from 1 to 6, more preferably from 1 to 2 phr of such curing agent.

The acid acceptor is preferably present in an amount effective to cure the halogenated sulfonated polyolefin; good results have been obtained when the acid acceptor is preferably present from 1 to 10, more preferably from 2 to 5 phr.

The polyolefin of the halogenated sulfonated polyolefin is preferably selected from the group consisting of: polyethylene, polypropylene, polyethylene co-monomers, polypropylene comonomers, and mixtures thereof.

Preferably the halogenated, sulfonated polyolefin is a chlorinated sulfonated polyethylene. Preferably the chlorinated sulfonated polyethylene has a chlorine content of from 37% to 47%, more preferably 41.% to 44.5%. A suitable chlorosulfonated polyethylene is commercially available under the trade name "Hypalon" from Du Pont.

The epoxidized rubber is an epoxidized natural rubber or an epoxidized synthetic rubber. Preferably the epoxidized rubber is epoxidized natural rubber. Suitable epoxidized natural rubbers are commercially available under the trade names Epoxyprene 25 or Epoxyprene 50 from Guthrie Latex, Inc. The Epoxyprene 50 is preferred when the chemically resistant elastomer to be employed in the chemically resistant layer of the composite liner contains nitrile rubber.

Preferably the low viscosity halogenated rubber has a viscosity of less than 3,000 cPs, more preferably less than 2,000 cPs, most preferably less than 1500 cPs.

Preferably the low viscosity halogenated rubber has a viscosity of from 50 to 3000, more preferably from 200 to 2,000 most preferably from 300 to 1,500 Pas. Preferably the low viscosity halogenated rubber is a polychloroprene. Preferably the polychloroprene is sulfur modified stabilized with thiuram disulfide and preferably has a chlorine content of from 13% to 65%, more preferably 23% to 55%, even more preferably 33% to 45%, most preferably 38% to 40%. Preferably the low viscosity polychloroprene has a viscosity of 500–1,300 paschals as measured at 50° C., Brookfield spindle number 72 revolutions per minute or when expressed in centipoise, $0.5 \times 10^6$–$1.3 \times 10^6$ centipoise.

A suitable low viscosity polychloroprene is commercially available under the trade name "Neoprene FB" from DuPont. The Neoprene FB offers the further advantage of contributing to tack.

The Additive

The Acid Acceptor

Preferably, an acid acceptor for halogenated sulfonated polyolefin is employed, more preferably metallic oxide acid acceptor is employed, most preferably a magnesium oxide acid acceptor is employed, to control the pH and chlorine content of the composition as the chlorosulfonated polyethylene cures. The chlorosulfonated polyethylene cure proceeds in the presence of moisture. Preferably the acid acceptor is present from an effective amount to retard the room temperature cure of the halogenated, sulfonated polyolefin. The acid acceptor is present preferably from 0% to 20; more preferably from 0.1 to 20, even more preferably from 2 to 15, most preferably from 4 to 8 parts per parts per hundred parts of rubber hydrocarbon, hereinafter "RHC". A suitable magnesium oxide acid acceptor is available as Plastomag 170 which contains 65% Elastomag, that is magnesium oxide and 35% Naphthenic Process Oil. Plastomag 170 is commercially available from Akrochem.

The Tackifier

Preferably, there is at least one tackifier to provide the composite liner with a repositionable, short term adherance to the substrate, before curing. Preferably, the tackifier comprises a phenolic resin to increase tack of the tie layer prior to curing. This provides the composite liner with tack to hold the composite liner against the substrate particularly vertical surfaces, yet permits repositioning of the composite liner. The phenolic resin is preferably an alkyl phenolic resin, more preferably a alkyl phenol formaldehyde novolac resin. Other suitable tackifiers are ketone polymers, preferably coumarone indene resins. A suitable coumarone indene resin is a 72% coumarone indene resin with a number molecular weight of 3.5, a melt point of 25° C., in silica, which is commercially available under the designation KD109DLC from Akron Dispersions.

Preferably the alkyl phenol formaldehyde novolac resin has a melting point of from 80° C. to 100° C., more preferably from 85° C. to 95° C., most preferably 90° C., an acid number of 30–36, most preferably 33, specific gravity of preferably 1.00. A suitable alkyl phenol formaldehyde novolac resin is commercially available as P90 from Akrochem Corporation, Akron Ohio.

Preferably the tackifier is present in an amount sufficient to provide tack, that is hold the composite liner to the substrate prior to curing the tie layer. The tackifier resin is preferably present from 0.01 to 30, even more preferably from 2 to 15, most preferably from 2 to 10 parts per RHC.

The Adhesion Agents

The tie gum comprises at least one adhesion agent. The term "adhesion agent" as used herein is intended to encompass compounds which enhance the adhesion of the tie gum to the substrate after cure of the tie gum whether or not such compounds also contribute to pre-cure adhesion. However, as used herein "tackifier" is intended to encompass compounds which enhance the adhesion of the tie gum to the substrate before cure, but do not contribute to post-cure adhesion.

Preferably, the adhesion agent has a viscosity greater than 15,000 cPs. Preferably, the adhesion agent is a conventional adhesion agent known in the rubber industry. A suitable adhesion agent is a resorinol, melamine formaldehyde resin and dibutyl phthalate mixture, or a butadiene homopolymer-maleic anhydride adduct or mixtures thereof. A suitable adhesion agent is butadiene homopolymer-maleic anhydride adduct, preferably having a calculated molecular weight of 5.1 Mn (×1000) and a viscosity of 30,000–70,000 cPs at 45° C. A suitable butadiene homopolymer-maleic anhydride adduct is commercially available as Ricobond 1731 from Ricon Resins Inc. Grand Junction, Colo. The Ricobond 1731 has the advantage of also contributing to tack. Other suitable adhesion agents are, for example: a resorinol melamine formaldehyde resin and 9% dibutyl phthalate mixture having a viscosity of 200–400 mcPs at 23° C., commercially available as Cohedur RL from Rheim Chemie Group, Akron Ohio; a two component adhesion agent, containing hexamethylol melamine ether on 50% filler, commercially available under the designation Cohedur A150; and a homogenous solidified melt of resorcinol and stearic acid in a 2:1 ratio, commercially available under the trade designation Cohedur RS, from Rheim Chemie Group, Akron Ohio.

Preferably the adhesion agent is present in an amount effective amount to adhere the composite liner to a substrate, after curing the tie layer. The adhesion agent is preferably present from 0 to 20, more preferably from 0.01 to 20, even more preferably 8 to 13 parts per RHC.

Curing Agents

The curing agents are conventional and known in the art. For example, a sulfur curing agent, specifically insoluble sulfur, is preferred to cure the epoxidized rubber. The insoluble sulfur is preferred because of its non-blooming properties. Preferably the curing agent is present in an amount effective amount to cure the epoxidized rubber.

Reinforcing Agents

Optionally, a reinforcing agent is added to provide the tie layer with tensile strength and hardness. Suitable reinforcing agents are, for example, silicate and amorphous silica. A preferred amorphous silica is a precipitated hydrated amorphous silica available as HISIL 233 from PPG. The reinforcing agent is preferably present from 0 to 50, more preferably from 0.01 to 50, even more preferably 1 to 25, most preferably from 10 to 20 parts per RHC.

Desiccant

Optionally, a desiccant is added to absorb moisture which, depending upon the moisture content of the components used, may cause gassing during curing. Desiccants are conventional; a suitable desiccant is calcium oxide. The desiccant is preferably present from 0 to 20, more preferably from 0.01 to 20, even more preferably 0.1 to 10, most preferably from 0.5 to 6 parts per RHC. A suitable desiccant is a mixture of 80% finely ground calcium oxide and 20% high flash process oil which is commercially available as Desical P from Akron Chemical.

Antioxidant

Optionally, an antioxidant is added. The antioxidant is conventional; a suitable antioxidant is 2,2,4-trimethyl-1,2-dihydroquinoline available as Struktol TMQ from Struktol Co. Another suitable antioxidant is a mixture of octylated dephenyl amines, having a density of 1.02, a melting point of 90–99° C., a maximum ash of 0.6%, and which is soluble in alcohol, and toluene, and not soluble in water. A mixture of octylated dephenyl amines, having a density of 1.02, is commercially available as Age Rite Stalite S from RT Vanderbilt Company. The antioxidant is preferably present from 0 to 10, more preferably from 0.01 to 10, even more preferably 0.1 to 5, most preferably from 0.1 to 3 parts per RHC.

Fatty Acid

Optionally, a fatty acid is added to decrease the viscosity of the tie gum. A suitable fatty acid is stearic acid. The fatty acid is preferably present from 0 to 20, more preferably from 0.001 to 20, even more preferably 0.01 to 5, most preferably from 0.1 to 2 parts per RHC.

Optionally, a retarder is added to decrease the scorch of epoxidized rubber in the tie gum and to increase storage stability. A suitable retarder is a N-(cyclohexylthio) phthalmide commercially available as Santogard PVI from Monsanto. The retarder is preferably present from 0 to 20, more preferably from 0.001 to 20, even more preferably 0.01 to 5, most preferably from 0.1 to 1 parts per RHC.

Other Optional Ingredients

Optionally, pigment is added to the tie gum to make the tie layer more visible which assists in the application of the composite liner. The pigments are conventional; a suitable white pigment titanium oxide. A suitable black pigment is styrene butadiene black master batch available from Ameripol Corporation. Optionally, the tie gum comprises pigment in an amount sufficient to impart color to the tie gum. While greater than 50 RHC could be added it is not needed. The pigment is preferably present from 0 to 50, more preferably from 0.01 to 25, even more preferably 0.1 to 10, most preferably from 0.1 to 7 parts per RHC.

Optionally, particularly in embodiments where the low viscosity halogenated rubber is not employed, a processing oil is used to enhance tack and lower viscosity. A suitable processing oil is a di(butoxyethyoxyethyl) sebaceous substitute processing oil which is commercially available as Plasthall 83SS from C. P. Hall. The processing oil is preferably present from 0 to 20, more preferably from 0.01 to 20, even more preferably 0.1 to 10, most preferably from 0.5 to 4 parts per RHC.

Preferably there is less than 5%, by weight water in the tie gum, more preferably less than 1% water, even more preferably less than 0.5% by weight by weight water in the tie gum.

The minimum viscosity expressed as torque time, of the tie gum is preferably at least 0.75, as measured with moving die rheometer at 350° F. at ½ degree arc.

The Epoxy Primer

The epoxy primer is used to coat the substrate to provide a suitable surface for adhesion of the tie layer. The epoxy primer comprises an epoxy resin system comprising: a liquid bisphenol A epichlorohydrin epoxy resin, having at least two epoxy groups per molecule; an elastomer modified epoxy resin, preferably a carboxy terminated butadiene-acrylonitrile elastomer reacted with a diglycydyl ether, more preferably a carboxy terminated butadiene-acrylonitrile elastomer reacted with a diglycydyl ether of a glycol, even more preferably reacted 50–50 with a diglycydyl ether of neopentyl glycol. The primer further comprises a liquid epoxy functional modifier, preferably a liquid diglycydyl ether, more preferably a diglycydyl ether of neo pentyl glycol; and a curing agent for the epoxy resin system. As used herein, the term "liquid" means that the material is liquid at 20° C.

Preferably the epoxy primer contains at least 95% solids, more preferably least 97% solids, even more preferably least 99% solids, most preferably 100% solids. Preferably, the epoxy primer contains less than 5% more preferably less than 1%, even more preferably less than 0.1%, most preferably less than 1 part per million volatile organic compounds.

For every one hundred parts of the epoxy resin system, there are preferably from 0.1 to about 1000 parts, more preferably from 10 to 500 parts per hundred parts epoxy resin system of primer additives. Hereinafter with reference to the epoxy primer, "parts per hundred parts epoxy resin system" is referred to as "pph".

Preferably the epoxy resin system is comprised of from about 30% to about 99.9%, more preferably from 55% to 95%, most preferably 75% to 85% of the liquid bisphenol A epichlorohydrin epoxy resin; and preferably from 0.1% to 70%, even more preferably 5% to 45%, most preferably from 15% to 25% of the elastomer modified epoxy resin.

The epoxy primer additives comprise preferably from about 0 to about 50, more preferably from 0.1 to 30 parts; even more preferably from 5 to 15 parts, of the epoxy functional modifier; and preferably from about 0.5 to about 300 pph, more preferably from 22 to 230 pph, even more preferably from 75 to 175 pph, most preferably 110 to 145 of the epoxy curing agent. The epoxy curing agent is present in an amount effective to cure the epoxy resin system.

Preferably the liquid bisphenol A epichlorohydrin epoxy resin has an epoxy equivalent weight from 160 to 217, more preferably from 180 to 197. The liquid bisphenol A epichlorohydrin epoxy resin preferably has a viscosity at 25° C. of less than 5000 poise, more preferably less than 500 poise even more preferably less 180 poise.

A preferred liquid bisphenol A epichlorohydrin epoxy resin is difunctional and has an epoxy equivalent weight of about 185–192, a viscosity of 110 to 150 poise at 25° C., density of 1.16 g/ml at 25° C., a vapor pressure of 0.03 at 77° C. a refractive index of 1.573 at 25° C. and a specific hear of 0.5 cal/g/°C. A suitable such liquid bisphenol A epichlorohydrin epoxy resin is commercially available as Epon 828 from Shell Chemical Company.

The elastomer modified epoxy resin is employed as a source of rubber in the epoxy primer to compatiblize the epoxy rubber with the tie gum. Preferably, the elastomer modified epoxy resin is an elastomer modified epoxy functional adduct formed from the reaction of a diglycidyl ether of neopentyl glycol and a carboxyi terminated butadiene-acrylonitrile elastomer. Preferably, the elastomer modified epoxy resin has an epoxide equivalent weight of 255 to 325, a viscosity of from about 3000 to 9000 cps. A preferred elastomer modified epoxy functional adduct has an epoxy equivalent weight of about 275 to 305 with a viscosity of about 4000 to 8000 cPs. A suitable such elastomer modified epoxy functional adduct is commercially available as EPON 58034 from the Shell Chemical Company.

The liquid epoxy functional modifier is employed to control the viscosity of the primer before curing, so that the epoxy primer may be applied to the substrate; preferably to render the epoxy primer sprayable. Preferably the liquid epoxy functional modifier has a viscosity of less than 20 cPs at 25° C. The liquid epoxy functional modifier preferably has a weight per epoxide of from 100 to 170, more preferably 120 to 150, and a viscosity of 5 to 30 cPs, more preferably 8 to 25.

The epoxy functional modifier is preferably a diglycydyl ether preferably a diglycydyl ether of neopentyl glycol, preferably having a viscosity at 25 C. of 13–18 cPs, a weight per epoxide of about 130–140 and a flash point less than 200° F. A suitable diglycydyl ether of neopentyl glycol is available as Heloxy 68 Modifier from the Shell Chemical Company.

The curing agent for curing the epoxy resins in the epoxy resin system is conventional. Preferably the curing agent is an amine curing agent and preferably it is a liquid. Preferably the epoxy curing agent is an oligomeric polyamine or an amidoamine curing agent. Preferably the amidoamine curing agent is a modified polyethylenepolyamine, even more preferably a modified polyethylenepolyamine with diethylenetriamine, Bisphenol A, and tetraethylenepentamine adducts. Suitable accelerated amines are available as Epi-cure 3072 and Epi-cure 3164 from the Shell Chemical Company.

Optionally, pigments are added to the primer. A suitable yellow pigment is commercially available as yellow epoxy resin masterbach 22-28420, from Ferro Corporation. A suitable red pigment is commercially available as Acrosperse E5948 red paste, from Akron Chemical.

Optionally, a conventional thickener, such as for example, fumed silica, is added to adjust the viscosity of the epoxy primer. As suitable thickener such is Cabosil ts-720 from Cabot Corporation.

Optionally a leveling agent is added in an amount to render the epoxy primer suitable for spraying, for example, at 0.1 parts to 0.2 parts. A suitable leveling agent is aliphatic polymeric ester, preferably with a viscosity of 700 cPs and is commercially available under the tradename FC Fluorad 430 leveling agent from 3M.

The Substrate

The substrate is composed of conventional material such as for example, metal, ceramic, glass, plastics particularly polyvinyl chloride, cement, concrete and wood. Carbon steel, stainless steel, copper, and aluminum substrates are particularly preferred.

In addition to protecting tank floors, walls and ceilings, the rubber laminate is also particularly useful for protecting pipes, fans, pumps, and scrubbers.

Preparation of the Rubber Liner

The composite liner is formed preferably by laminating a ply of tie gum to the chemically resistant ply using conventional techniques preferably calendering. Preferably, the chemically resistant elastomer is not cured until after application for ease in handling.

An interleaving layer, preferably of release paper, is preferably disposed on the chemically resistant layer. Preferably an interleaving layer is also applied to the tie layer to prevent adhesion of the tie layer to other surface during manufacturing, shipping, and handling. The interleaving layer is conventional; a suitable interleaving layer is a polyethylene film.

The chemical resistant elastomer is cured using conventional curing techniques; a suitable technique is open steam curing at 200° F. for 24 hours or in a vulcanizer at conventional times and temperatures for the particular chemical resistant elastomer.

Application of the Composite Liner

The composite liner is applied to a substrate that is preferably clean and free of loose material such as oxides. Conventional techniques for cleaning substrates may be used. Where the substrate is metal, good results have been obtained using such sand blasting.

To apply the composite liner, a single coat of the epoxy primer is preferably first applied to the substrate, using conventional techniques for applying coatings and paints, preferably by spraying. Preferably one coating of the epoxy primer is applied. The epoxy primer is then allowed to harden. Hardening of the epoxy primer is accomplished by conventional techniques such as ambient air curing, or accelerated curing techniques such as by radiant, or by convection heating. Preferably the epoxy primer is dried by conventional heaters at 150° F. for two hours. Air curing for 24 hours is also suitable. The method of application preferably does not employ volatile organic compounds.

For those embodiments of the composite liner which lack low viscosity halogenated rubber in the tie gum, a priming cement is optionally, though preferably applied over the epoxy primer to enhance adhesion. The priming cement comprises a halogenated, sulfonated polyolefin, an acid acceptor, a terpene, and a ketone to assist in solubilizing the halogenated sulfonated polyolefin. The priming cement is applied using conventional techniques and allowed to dry as described for the epoxy primer. The priming cement comprises halogenated, sulfonated polyolefin, an acid acceptor, a terpene, and a ketone to assist in solubilize the halogenated, sulfonated polyolefin.

Preferably the priming cement comprises from 5 to 35%, preferably from 10 to 20%, most preferably from 12% to 18% by weight, of the halogenated, sulfonated polyolefin, and preferably from 0.001% to 15%, more preferably from 0.1% to 10%, most preferably from 0.5% to 3%, acid acceptor; preferably from 40% to 90% more preferably from 60 to 70% by weight, terpene, preferably a cyclic terpene, preferably limonene; and preferably from 1% to 40%, more preferably from 5% to 25%, even more preferably from 10% to 20%, most preferably 14% to 16% ketone having from 3 to 30 carbon atoms.

A suitable priming cement was prepared by mixing 100 parts Hypalon 30 Chlorosulfonated Polyethylene, 17 parts N550 Black pigment, 10 parts magnesium oxide with an air mixer until thoroughly mixed. Then 1.5297 pounds of the first mixture was added to a second mixture containing 5.0382 pounds of d-limonene, and 1.1855 pounds cyclohexanone and mixed to provide a priming cement.

Optionally, the composite liner is warmed to increase the tack of the tie gum of the tie layer, using conventional heating techniques. For example a heat blanket or a warm up table is suitable.

Next, the composite liner is applied to the substrate by placing the tie layer against the primed substrate and applying even pressure, for example, by employing a 2 inch wide tank lining roller. Where the composite laminate is in the form of sheeting, the composite liner is preferably applied much like wall paper, with care taken to removed trapped pockets of air.

The seams are either joined to produce a closed skive, by conventional methods, or preferably the seams are joined using a seaming composition, preferably a terpene seaming composition or an elastomer water based seaming composition. The seaming composition is preferably a non toxic, non volatile organic tackifying composition that provides sufficient tack and tack time to seam the composite sheets.

In one embodiment, the seaming composition is comprised of a terpene, preferably limonene, preferably D-Limonene. D-Limonene is commercially available from Florida Chemical Co. Limonene is a non toxic, biodegradable, compound typically derived from citrus peel oil. D-Limonene has FDA-GRAS rating ("generally recognized as safe"). Preferably, in one embodiment the seaming composition comprises a 100% concentration of D-Limonene. In another embodiment the seaming composition is comprised of elastomers, for example natural rubber, styrene butadiene rubber, polybutadiene rubber and mixtures thereof, in a water base. Such compositions are disclosed in U.S. Pat. No. 5,395,879 issued Mar. 7, 1999, to Murray and which is fully incorporated herein by reference. A suitable such cement is commercially available as 30% solids under the trade designation N-9428 W/B Cement, from Akron Paint and Varnish Inc., Akron Ohio.

The seaming composition is applied to the seam area and closed skive area, a tacky surface is created that has a tack time preferably of at least 30 minutes, more preferably at least 8 hours, to allow the application rolling, stitching and finally closure of the skive onto the face of the adjoining panel (face compound to face compound), thus protecting the tie gum from chemical attack.

The lined substrate is then heated to cure the rubber system in the tie gum of the tie layer. Conventional methods for curing are employed. Good results were obtained using exhaust steam for 24 hours, or using vulcanizing curing at 270° F. for 2 hours.

EXAMPLES

Example 1

Epoxy Primer

An epoxy primer of the following formulation was prepared.

|  | Amount | |
| --- | --- | --- |
| Ingredient | Lbs. | Gals. |
| Part A | | |
| Epon Resin 828 from Shell Chemical Company Difunctional bisphenol A/epichlorohydrin derived liquid epoxy resin | 4.3500 | 0.4484 |
| Epon 58034 from Shell Chemical Company Carboxyl terminated butadiene-acrylonitrile elastomer reacted 50/50 with diglycidyl ether of neopentyl glycol | 1.0875 | 0.1310 |
| Heloxy 68 Modifier from Shell Chemical Company Diglycidyl ether of neopentyl glycol | 1.0875 | 0.0875 |
| 22-28420 Yellow Epoxy MB from Ferro Corporation Yellow epoxy resin masterbatch | 0.1633 | 0.1633 |
| Total of A | 6.6888 | 0.7181 |
| Part B | | |
| Epicure 3072 from Shell Chemical Company Accelerated amidoamine | 2.2836 | 0.2819 |
| Total of B | 2.2836 | 0.2819 |
| Total of A and B | 8.9719 | 1.0000 |

The above ingredients were combined and thoroughly mixed with a spatula in a plastic beaker to make a total of a 82.5 gram batch. Larger, five gallon batches were prepared Component A—by multiplying each of the above ingredients weight per gallon by five and pouring them into a clean 5 gallon bucket and mixing them with an air stirrer for 2 hours at room temperature.

Example 2

Epoxy Primer

An epoxy primer was prepared as in Example 1, except that the following materials were used.

| Ingredient | Amount Lbs. | Gals. |
|---|---|---|
| Part A | | |
| Epon Resin 828 from Shell Chemical Company Difunctional bisphenol A/epichlorohydrin derived liquid epoxy resin | 4.6041 | 0.4746 |
| Epon 58034 from Shell Chemical Company Carboxyl terminated butadiene-acrylonitrile elastomer reacted 50/50 with diglycidyl ether of neopentyl glycol | 1.1510 | 0.1387 |
| Heloxy 68 Modifier from Shell Chemical Company Diglycidyl ether of neopentyl glycol | 0.5755 | 0.0647 |
| 22-28420 Yellow Epoxy MB, pigment from Ferro Corporation | 0.1726 | 0.1730 |
| Cabosil ts-720 fumed silica from Cabot Corp., thickener | 0.1147 | 0.0063 |
| Total of A | 6.6179 | 0.7015 |
| Part B | | |
| Epicure 3072 from Shell Chemical Company Accelerated amidoamine | 2.4168 | 0.2884 |
| Total of B | 2.4168 | 0.2884 |
| Total of A and B | 9.0347 | 1.0000 |

Example 3

Epoxy Primer

An epoxy primer was prepared as in Example 1, except that the following materials were used.

| Ingredient | Amount Lbs. | Gals. |
|---|---|---|
| Part A | | |
| Epon Resin 828 from Shell Chemical Company Difunctional bisphenol A/epichlorohydrin derived liquid epoxy resin | 2.7800 | 0.2866 |
| Epon 58034 from Shell Chemical Company Carboxyl terminated butadiene-acrylonitrile elastomer reacted 50/50 with diglycidyl ether of neopentyl glycol | 0.6954 | 0.0838 |
| Heloxy 68 Modifier from Shell Chemical Company Diglycidyl ether of neopentyl glycol | 0.3477 | 0.0391 |
| 22-28420 Yellow Epoxy MB from Ferro Corporation Yellow epoxy resin masterbatch | 0.1041 | 0.0104 |
| Total of A | 3.9272 | 0.4199 |
| Part B | | |
| Epicure 3164 from Shell Chemical Co. oligomeric polyamine | 4.7267 | 0.5785 |
| E5948 red pigment | 0.0173 | 0.0016 |
| Total of B | 4.7440 | 0.5801 |
| Total of A and B | 8.6712 | 1.0000 |

When part A and part B are thoroughly mixed, the primer will appear orange.

Example 4

Tie Gum Composition

A tie gum of the following formulation was prepared.

| Ingredient | Amount (Parts RHC) |
|---|---|
| Epoxyprene 25 from Guthrie Latex, Inc. Epoxidized Natural Rubber | 40.00 |
| Hypalon 30 from DuPont Company Chlorosulfonated Polyethylene | 59.05 |
| Zinc Oxide | 2.00 |
| Stearic Acid | 0.50 |
| Struktol TMQ 2,2,4-trimethyl-1,2-dihydroquinoline Antioxidant | 1.00 |
| HiSil 233 from PPG precipitated, hydrated amorphous silica | 15.00 |
| Black Pigment - styrene butadiene 1606D Black Masterbatch | 1.00 |
| RL 90 titanium dioxide White Pigment | 2.50 |
| P90 from Akrochem Corporation, Akron, Ohio Phenolic Resin | 1.00 |
| Plasthall 83SS di (butoxyethoxyethyl) sebacate substitute Processing Oil | 2.80 |
| Desical P calcium dioxide Dessicant | 2.00 |
| Ricobond 1731 from Ricon Resins, Inc. butadiene homopolymer-maleic anhydride adductAdhesion Agent | 7 |
| Cohedur RS from Rheim Chemie Adhesion Agent | 1.5 |
| Cohedur A150 from Rheim Chemie Adhesion Agent | 1.84 |
| Crystex OT 20 insoluble sulfur curing agent | 1.45 |

The epoxidized natural rubber and the chloronated sulfonated polyolefin rubber were added to a lab mill, and thoroughly mixed. Then the zinc oxide, stearic acid, antioxidant, precipitated, hydrated amorphous silica, Black Pigment Masterbatch, White Pigment, phenolic Resin, Processing Aid and desiccant were added to the mill and thoroughly mixed. Then the adhesion agent, zinc oxide and insoluble sulfur were added and thoroughly mixed. The materials were then mixed at typically 100° F. to 150° F.

Example 5

A tie gum was prepared according to the Example 4, except that the following amounts of materials were used.

| Ingredient | Amount (Parts RHC) |
|---|---|
| Epoxyprene 25 from Guthrie Latex, Inc. Epoxidized Natural Rubber | 50.00 |
| Hypalon 30 from DuPont Company Chlorosulfonated Polyethylene | 50.00 |
| Zinc Oxide | 5.00 |
| Stearic Acid | 0.50 |
| Antioxidant | 1.00 |
| HiSil 233 from PPG precipitated, hydrated amorphous silica | 15.00 |
| Black Pigment Masterbatch | 1.00 |
| White Pigment RL90 titanium dioxide | 2.50 |
| Processing Aid | 2.00 |
| Desiccant | 2.00 |
| Ricobond 1731 from Ricon Resins, Inc. Adhesion Agent | 7.00 |
| Cohedur RL from Rheim Chemie Adhesion Agent | 4.51 |
| insoluble sulfur curing agent | 2.00 |

Example 6

A tie gum was prepared according to the Example 4, except that the following materials were used.

| Ingredient | Amount (Parts RHC) |
|---|---|
| Epoxyprene 25 from Guthrie Latex, Inc. Epoxidized Natural Rubber | 40.00 |
| Hypalon 30 from DuPont Company Chlorosulfonated Polyethylene | 59.38 |
| Zinc Oxide | 2.00 |
| Stearic Acid | 0.50 |
| Struktol TMQ 2,2,4-trimethyl-1,2-dihydroquinoline Antioxidant | 1.00 |
| HiSil 233 from PPG precipitated, hydrated amorphous silica amorphous silica | 15.00 |
| Black Pigment - styrene butadiene 1606D Black Masterbatch | 1.00 |
| CR828 titanium dioxide White Pigment | 2.50 |
| P90 alkyl phenol tackifier from Akrochem Corporation, Akron, Ohio Phenolic Resin | 6.00 |
| Plasthall 83SS di(butoxyethoxyethyl) sebacate substitute Processing Oil | 2.00 |
| Desical P calcium dioxide Dessicant | 2.00 |
| Ricobond 1731 from Ricon Resins, Inc. butadiene homopolymer-maleic anhydride adduct | 7.00 |
| KD109DLC from Akron Despersions 72% coumarone Indene Resin Dry liquid Concentrate | 7.00 |
| Cohedur RL from Rhein Chemie Solution of Cohedur A in Resorcinol | 5.40 |
| Crystex OT 20 Insoluble Sulfur from AKZO | 2.00 |
| E-9219 DBA DLC (75% Dibenzyl Amine 75% Dry Liquid Concentrate Akrochem | 1.10 |
| Plastomag 170 - Magnesium Oxide from Akrochem | 6.00 |
| Total RHC | 159.88 |

Example 7

A tie gum was prepared by first compounding the epoxidized rubber with the ingredients listed below, specifically the epoxyprene, stearic acid and Santogard were combined and mixed for 1 minute in a banbury mixer. The remaining items were added and sweeped at 260° F. for about 1 minute and then heated to 270° F. and mixed for about 6–8 minutes to provide mixture 1.

| | |
|---|---|
| Epoxyprene 25 from Guthrie Latex, Inc. Epoxidized Natural Rubber | 60.00 |
| Stearic Acid | 1.00 |
| Santogard PVI retarder N-(cyclohexylthio) phthalmide | 0.50 |
| Stalite Antioxidant flake | 1.00 |
| HiSil 233 from PPG percipitated, hydrated amorphous silica | 15.00 |
| CR828 titanium dioxide White Pigment | 2.50 |
| Black Pigment - styrene butadiene 1606D Black Masterbatch | 1.00 |
| P90 alkyl phenol tackifier from Akrochem Corporation, Akron, Ohio Phenolic Resin | 6.00 |
| KD109DLC from Akron Despersions 72% Cumar P25, a Coumarone Indene Resin Dry liquid Concentrate | 7.00 |

Next, room temperature mixture 1 was combined with Neoprene, Hypalon, Plastomag and then the remaining items were added and dropped at 200° F., that is mixed thoroughly, for about 8 minutes to provide the tie gum.

| | |
|---|---|
| Mixture 1 | 94.00 |
| Neoprene FB | 25.00 |
| Hypalon 30 from DuPont Company Chlorosulfonated Polyethlene | 14.38 |
| Plastomag 170 - Magnesium Oxide from Akrochem | 3.00 |
| Ricobond 1731 from Ricon Resins, Inc. butadiene homopolymer-maleic anhydride adduct | 7.00 |
| Cohedur RL from Rhein Chemie Solution of Cohedur A in Resorcinol | 5.64 |
| MM Crystex 4997-PD Insoluble Sulfur from AKZO | 2.00 |
| ZIC STICK 85 zinc oxide dispersion in oil | 5.00 |
| Desical P calcium dioxide Dessicant | 5.00 |

Example 8
Preparation of Composite Liner

One ply of the tie gum of Example 4, was sheeted off a lab mill and pressed between two pieces of interleaving layers of polyethylene film. Then one layer of the film was removed. Next, five pre-calendered plies of the chemical resistant layer were pressed onto the tie layer using a conventional 2" wide tank lining roller, to form a composite liner.

Example 9
Preparation of Composite Liner

A composite liner was prepared as in example 8, except that the tie gum of example 5 was used.

Example 10
Application of Composite Liner to a Substrate

The composite liner of Examples 8 and 9 was warmed in an oven at 140° for 15 minutes. The interleaving polyethylene film layer was removed; the tie gum of the tie layer was tacky. The warmed composite liner was then pressed with the 2" roller onto a carbon steel plate. The carbon steel plates were either coated with both the epoxy primer of examples 1 or 2 and the priming cement of example 7b, or just coated with the epoxy primer of examples 1 or 2.

The composite layer adhered to the metal plate whether the metal plate was positioned vertically or horizontally.

The lined plated was cured in exhaust steam for 24 hours, to provide a lined substrate. The lined substrate was removed and allowed to rest 24 hours before evaluation.

Example 11

A lined substrate prepared as in Example 8, having the tie gum of Example 4, was applied to carbon steel substrate as in Example 10, except that the lined substrate was cured in an autoclave and vulcanized cured 2 hours at 270° F., instead of cured in exhaust steam for 24 hours.

Example 12
Application of Composite Liner to a Substrate

The lined substrate prepared as in Example 8, having the tie gum of Example 4, was applied to concrete substrate as in Example 10.

Example 13
Application of Composite Liner to a Substrate

The lined substrate prepared as in Example 8, having the tie gum of Example 4, was applied to a PVC substrate as in Example 10, except that a proprietary adhesive specialty polymer cement for synthetics, available as P100 primer from Morton Int'l/Blair Rubber Company was first applied to the PVC.

Example 14
Application of Composite Liner to a Substrate

A lined substrate was prepared by pressing composite liner having the tie gum of Example 7, with the 2" roller onto a carbon steel plate. The carbon steel plate was coated with epoxy primer of Example 3, without warming up the steel plate.

The composite layer adhered to the metal plate whether the metal plate was positioned vertically or horizontally. The lined plated was cured in exhaust steam for 24 hours, to provide a lined substrate. The lined substrate was removed and allowed to rest 24 hours before evaluation.

Evaluation

The lined substrate produced according to Examples 7, 8, 9 and 12 were subjected to pull tests 24 hours after cure, according to ASTM D429 Standard Test Methods for Rubber Property—Adhesion to Rigid Substrate, (1993), Method E 90 Degree Strip Test. The results are shown below in Table I.

TABLE I

| Composite Liner Example | Withstood Adhesion Force |
|---|---|
| 6 | 40 lbs/linear inch |
| 7 | 40 lbs/linear inch |
| 8 | 40 lbs/linear inch |
| 9 | 40 lbs/linear inch |
| 12 | 40 lbs/linear inch |

Composite liner panels were seamed together in the following manner. Each panel is skived, that is, each panel edge is cut at a 45° angle to produce an open skive on one side of the panel and a closed 45° skive on the other side of the panel, using a conventional Linetex electric skiver from Linetex Company. The edges of two adjacent panels were overlapped by two inches. About 10 minutes prior to joining the panels the seam composition was brushed onto the exposed, angled chemically resistant layer edge of the top panel and to the surface of the chemically resistant layer area of the underlying panel. The seam composition air dried for about 10 minutes, and the 2" lap section s were joined together using conventional rolling and stitching methods. The closed skive or seam was thoroughly stitched down to protect the tie gum from the contents of the tank.

The composite liner panels having the tie gum of example 7 were sealed with a D-limonone seaming composition. Additional composite liner panels having the tie gum of example 7 were sealed with the water based elastomeric seaming composition, specifically the N9426 water based cement.

What is claimed is:

1. A corrosive resistant, composite liner comprising:

a chemically resistant layer, comprising a chemically resistant elastomer; and a tie layer, disposed on the chemically resistant layer, said tie layer comprising:
        a rubber system comprising:
            from 10% to 99% by weight of the rubber system, of an epoxidized rubber;
            from 1% to 90% by weight of the rubber system, of a halogenated sulfonated polyolefin elastomer; and
            from 1% to 60% by weight of the rubber system, of a low viscosity halogenated rubber having a viscosity less than 3,000 paschals;
        an additive system comprising:
            a curing agent in an amount effective to cure the epoxidized rubber.

2. The liner of claim 1, wherein the epoxidized rubber is selected from the group consisting of: epoxidized natural rubber, epoxidized synthetic rubber, epoxidized natural rubber, epoxidized butyl rubber, epoxidized nitrile rubber, epoxidized polyisoprene rubber, epoxidized styrene-butadiene rubber, epoxidized polychloroprene rubber, epoxidized neoprene rubber/elastomers, bromobutyl rubber, epoxidized chlorobutyl rubber, elastomer, epoxidized terpolymer elastomers made from ethylene proplylenediene monomer, and mixtures thereof; and wherein the halogenated sulfonated polyolefin elastomer is selected from the group consisting of: halogenated sulfonated polyethylene, halogenated sulfonated polypropylene, halogenated sulfonated polyethylene copolymer, halogenated sulfonated polypropylene copolymer, and mixtures thereof;

and wherein the additive system further comprises a tackifier and an adhesion agent.

3. The liner of claim 2, wherein the chemically resistant elastomer is selected from the group consisting of: natural rubber, polyisoprene rubber, epoxidized natural rubber, nitrile rubber, polybutadiene, polyisobutylene/butyl rubber, styrene-butadiene rubber styrene-isoprene, polychloroprene, bromobutyl rubber, chlorobutyl rubber, chlorosulfonated polyethylene rubber, ethylene co-polymer rubbers, olefin rubbers, chlorinated polyethylene elastomer, terpolymer elastomers made from ethylene-proplylene-diene monomer, and mixtures thereof.

4. The liner of claim 2, wherein the epoxidized rubber comprises epoxidized natural rubber; and the halogenated sulfonated polyolefin comprises chlorosulfonated polyethylene; the tackifier is a phenolic resin or coumarane indene resin; and the adhesion agent is a resorinol, melamine formaldehyde resin and dibutyl phthalate mixture, or a butadiene homopolymer-maleic anhydride adduct, or mixtures thereof.

5. The liner of claim 4, wherein the elastomer is polychloroprene.

6. The liner of claim 2, characterized in that when applied to a steel substrate and cured, the liner displays an adhesion force of greater than 30 pounds/linear inch as measured by ASTM D429 Standard Test Methods for Rubber Property—Adhesion to Rigid Substrate, (1993), Method E 90 Degree Strip Test.

7. The liner of claim 2, wherein the tie gum contains less than 1% volatile organic compounds.

8. The liner of claim 3, further comprising:
an effective amount of an acid acceptor;
wherein the adhesion agent is a resorinol, melamine formaldehyde resin and dibutyl phthalate mixture, or a butadiene homopolymer-maleic anhydride adduct or mixtures thereof.

9. The liner of claim 8, wherein there is:
from 45% to 75% of the rubber system, of the epoxidized rubber;
from 5% to 50% of the rubber system, of the halogenated sulfonated polyolefin elastomer;
11% to 41% of the rubber system, of the low viscosity halogenated rubber wherein the viscosity is less than 2,000 paschals;
wherein the tie gum further comprises:
a fatty acid;
a reinforcing agent; and
a dessicant.

10. The liner of claim 9, wherein there is:
from 55% to 65% of the rubber system, of the epoxidized rubber;
from 10% to 20% of the rubber system, of the halogenated sulfonated polyolefin elastomer;
21% to 31% of the rubber system of the low viscosity halogenated rubber;
wherein the halogenated sulfonated polyolefin elastomer comprises a chlorinated sulfonated polyethylene; the tackifier comprises alkyl phenol formaldehyde novolac resin or coumarine indene resin; the low viscosity halogenated rubber is polychloroprene; the acid acceptor comprises a metal oxide; the adhesion agent comprises resorinol, melamine formaldehyde resin and dibutyl phthalate mixture, or a butadiene homopolymer-maleic anhydride adduct; and the reinforcing agent comprises silica.

11. The liner of claim 10, wherein the chemically resistant elastomer is polychloroprene, and the liner is characterized in that when applied to a steel substrate and cured, the liner displays an adhesion force of greater than 40 pounds/linear inch as measured by ASTM D429 Standard Test Methods for Rubber Property—Adhesion to Rigid Substrate, (1993), Method E 90 Degree Strip Test.

12. An epoxy primer, comprising:
epoxy resin system comprising:
from 30% to 99.9%, by weight of the epoxy resin system, of a liquid bisphenol A epichlorohydrin epoxy resin, having at least two epoxy groups per molecule;
from 0.1% to 70% parts of the epoxy resin system, of a elastomer modified epoxy resin;
from 0 to 50 pph of a liquid epoxy functional modifier, and
a curing agent in an amount effective to cure the epoxy resin system.

13. The epoxy primer of claim 12, wherein: the liquid epoxy functional modifier is present in an amount effective to control viscosity and comprises a liquid digylcydyl ether; the elastomer modified epoxy resin comprises a carboxy terminated butadiene-acrylonitrile elastomer reacted with a digylcydyl ether; and the curing agent is an amidoamine curing agent.

14. The epoxy primer of claim 13, wherein the liquid digylcydyl ether comprises a diglycydyl ether of neo pentyl glycol, the carboxy terminated butadiene-acrylonitrile elastomer is reacted 50/50 with a digylcydyl ether of neopentyl glycol, and the epoxy primer contains at least 95% solids.

15. The epoxy primer of claim 12, wherein the epoxy primer contains less than 1% of volatile organic compounds.

16. A system for protecting substrates from corrosive agents comprising:
a composite liner comprising:
a chemically resistant layer, comprising a chemically resistant elastomer; and
a tie layer, disposed on the chemically resistant layer, said tie layer comprising:
a rubber system comprising:
from 10% to 99% of the rubber system, an epoxidized rubber;
from 1% to 90% of the rubber system, a halogenated sulfonated polyolefin elastomer; and
from 0% to 60% of the rubber system, a low viscosity halogenated rubber having a viscosity less than 3,000 paschals;
an additive system comprising:
a curing agent in an amount effective to cure the epoxidized rubber; and
an epoxy primer, for coating the surface of the substrate, comprising:
an epoxy resin system comprising:
from 30% to 99.9% of a liquid bisphenol A epichlorohydrin epoxy resin, having at least two epoxy groups per molecule;
from 0.1% to 70% of a elastomer modified epoxy resin; 0.1 to 1000 pph of primer additives comprising:
from 0 to 50 pph of a liquid epoxy functional modifier, and
a curing agent in an amount effective to cure the epoxy resin system.

17. The system of claim 16, further comprising a primer cement which comprises from 5 to 35% by weight, of the halogenated, sulfonated polyolefin; from 0.001% to 15% of the acid acceptor; from 40% to 90% by weight, terpene; from 1% to 40%, ketone having from 3–30 carbon atoms.

18. The system of claim 16, further comprising a seaming composition comprising a terpene.

19. The system of claim 18, wherein the terpene comprises D-limonene.

20. The system of claim 16, further comprising the step of seaming the panels with seaming composition comprising elastomer selected from the group consisting essentially of natural rubber, styrene butadiene rubber and mixtures thereof.

21. A tie gum composition for adhering an elastomer to as substrate comprising:
a rubber system comprising:
from 10% to 99% by weight of the rubber system, of an epoxidized rubber;
from 1% to 90% by weight of the rubber system, of a halogenated sulfonated polyolefin elastomer; and
from 1% to 60% of the rubber system, a low viscosity halogenated rubber having a viscosity less than 3000 paschals;
an additive system comprising:
a curing agent in an amount effective to cure the epoxidized rubber.

* * * * *